Feb. 17, 1925.

B. R. WINGFIELD

STEAM TRAP

Filed Nov. 4, 1924

1,527,102

Inventor
B. R. Wingfield
by Wilkinson & Giusta
Attorneys

Patented Feb. 17, 1925.

1,527,102

UNITED STATES PATENT OFFICE.

BERNARD ROBERT WINGFIELD, OF WEST DRAYTON, ENGLAND.

STEAM TRAP.

Application filed November 4, 1924. Serial No. 747,825.

*To all whom it may concern:*

Be it known that I, BERNARD ROBERT WINGFIELD, a subject of the King of Great Britain, residing in West Drayton, England, have invented certain new and useful Improvements in Steam Traps, of which the following is a specification.

My invention relates to steam traps having a valve that is actuated by the expansion and contraction of a capsule containing a volatile liquid, and it has for its object an improved capsule which does not contain any joints formed in conjunction with soft solder and is, therefore, suitable for steam pressures at which the steam temperature exceeds the melting temperature of soft solder.

A steam trap capsule in accordance with my invention consists essentially of a rigid circular plate or disc corrugated on one side or face, a diaphragm or elastic plate spun or pressed over the corrugated side of the rigid plate and hard or silver-soldered or welded to the rigid plate simultaneously with a filling tube, the diaphragm being spun into the corrugations of the back plate after the hard soldering or welding operation to re-establish its elasticity. The diaphragm carries the valve or the valve holder and the rigid back plate is provided with means for suspending the capsule.

A capsule for a steam trap, constructed according to my invention, is illustrated in the accompanying drawing, in which:—

Figure 1:
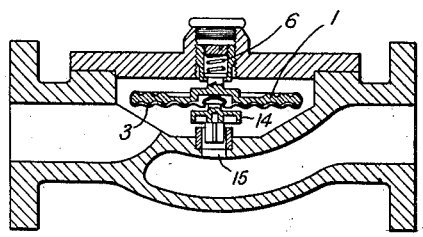
Fig. 1 is a longitudinal section of a steam trap provided with the improved capsule.

The improved capsule consists of a rigid back plate 1 with a projection 2 for the attachment of a regulating device 6, the back plate being provided with corrugations 5 on its back or lower face. Over the edge 7 of the back plate is spun a thin flat metal disc or diaphragm 3.

The valve holder or stem 8 is fastened in a suitable manner to the centre of the diaphragm before it is applied to the back plate 1. According to the preferred manner of fastening the holder or stem 8 to the diaphragm, the upper end of the part 8 is enlarged and rounded, a shoulder being formed thereon at 9. The rounded head is then seated in a cup-like recess 10 formed at the centre of the diaphragm, a portion of which is pressed in a way for it to engage with the shouldered part 9 of the head so that that part will be suspended from the diaphragm. The central part of the plate 1 may be formed with a recess 13 to accommodate the rounded end of the part 8.

Figure 2:
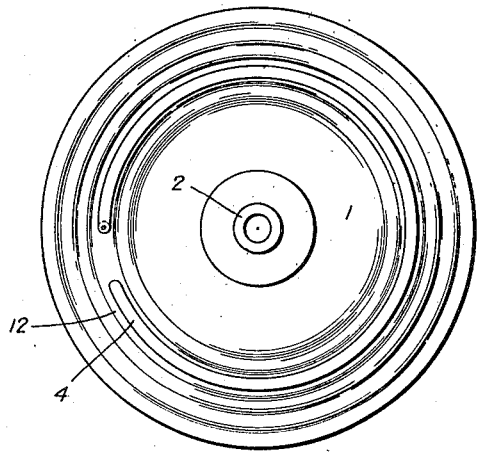
Fig. 2 is a plan of the capsule drawn to an enlarged scale.
Figure 3:
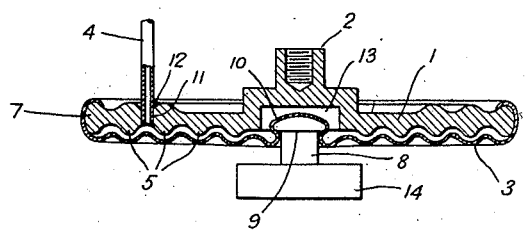
Fig. 3 is a vertical section thereof.

The diaphragm 3 is rigidly connected by means of hard-soldering or welding to the back plate and at the same time a capillary tube 4 is inserted in a hole 11 provided in the plate, the tube being hard-soldered or welded into the plate. The tube has a length corresponding to the circumference of a groove 12 formed in the plate, for the reception of the tube when folded down as shown in Fig. 2.

During the hard-soldering or welding process the plate becomes softened and in order to restore its hardness and elasticity which is necessary for its action as a diaphragm, it is, after the joining process, corrugated into the corrugations 5. When the diaphragm is corrugated the chamber between it and the plate 1 is evacuated and liquid is sucked into it through the capillary tube which is then closed at its end by hard-soldering or welding and embedded in its groove 12. During the closing of the tube the diaphragm should be immersed in water so that it may not be affected by the heat applied during the closing operation.

Very little liquid is used in the chamber so that the whole of it is converted into vapour at a definite pressure and any further increase in steam pressure only causes a rise of pressure inside the chamber according to the laws of unsaturated vapour.

Fig. 1 shows an example of a steam trap constructed in accordance with the invention.

The initial height of the valve 14 carried by the holder or stem 8, relative to the orifice 15 that it controls, can be regulated by means of the device 6.

Having thus described the nature of the said invention and the best means I know of carrying the same into practical effect, I claim:

1. A capsule for a steam trap comprising in combination a rigid circular plate corrugated on one face, an elastic diaphragm plate rigidly attached to the rigid plate in a manner to cover the corrugated face thereof and to form therewith an expansion chamber, and a filling tube welded to the rigid plate communicating with said chamber, the diaphragm plate being spun into the corrugations on the rigid plate, substantially as described.

2. A capsule for a steam trap comprising in combination a rigid circular plate corrugated on one face, an elastic diaphragm plate welded to the rigid plate in a manner to cover the corrugated face thereof and to form therewith an expansion chamber, and a filling tube welded to the rigid plate communicating with said chamber, the diaphragm plate being spun into the corrugations on the rigid plate, substantially as described.

In testimony whereof I have signed my name to this specification.

BERNARD ROBERT WINGFIELD. [L. S.]